May 4, 1943.   A. R. POWELL   2,318,522
GAS PURIFICATION PROCESS
Filed July 24, 1940
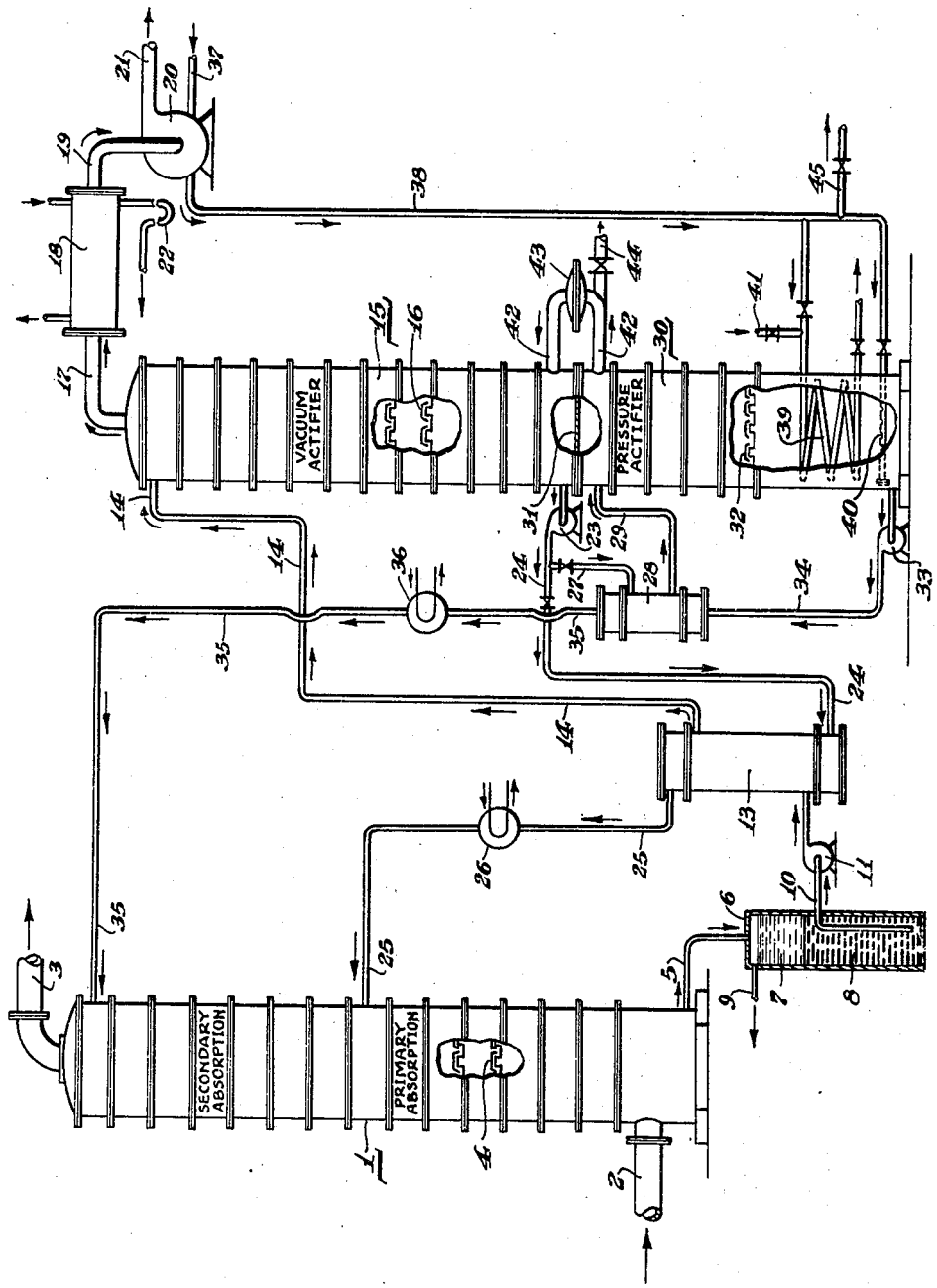
INVENTOR.
ALFRED R. POWELL.
BY Henry Love Clarke
his atty.

Patented May 4, 1943

2,318,522

UNITED STATES PATENT OFFICE 2,318,522

GAS PURIFICATION PROCESS

Alfred R. Powell, Pittsburgh, Pa., assignor to Koppers Company, a corporation of Delaware Application July 24, 1940, Serial No. 347,131

5 Claims. (Cl. 23—3)

The present invention relates to an improved cyclic process for the continuous removal of hydrogen sulphide in the presence of large quantities of carbon dioxide from gases containing the same.

It is well known in the art that aqueous solutions of the alkali-metal carbonates can be employed to extract hydrogen sulphide and carbon dioxide from fuel gases. Various methods have been employed for actifying the spent solution after the absorption step, as for example by flowing the spent solution in counter-current to large quantities of air or by boiling at reduced, normal and also at elevated pressures.

In the removal of hydrogen sulphide and carbon dioxide by means of alkali-metal carbonates, the same are absorbed to form the hydrosulphide and bicarbonate respectively. In such fuel gases as coke-oven gas the carbon dioxide is normally present in relatively limited amounts, so that when the scrubbing solution reaches a substantial equilibrium with the gas being treated, the bicarbonate is not present in quantities sufficient to prevent a practical removal of hydrogen sulphide by such solution from the treated gas. Moreover, a certain amount of bicarbonate assists in the actification by combining with the hydrosulphide for the expulsion of hydrogen sulphide.

It is often desirable to remove hydrogen sulphide from industrial gases wherein large quantities of carbon dioxide are present. During the absorption step the carbon dioxide is also absorbed by the alkali-metal carbonate to form the bicarbonate and when equilibrium between the solution and the gas has been reached, the carbonate of the solution has been converted to the bicarbonate and, even after a degree of actification that is suitable for removing the greater part of the hydrogen sulphide, this bicarbonate still persists in the solution to an extent such that its original absorbing capacity for hydrogen sulphide has been greatly decreased. In the actification of such spent solutions hydrogen sulphide is relatively easily removed but the conversion of the bicarbonate to the carbonate, to maintain hydrogen sulphide absorptive efficiency, requires more drastic measures. It is thus apparent that the employing of alkali-metal carbonate solutions for hydrogen sulphide extraction from high carbon dioxide bearing gases presents many practical difficulties and their employment for this purpose is often entirely impractical in a simple cyclic process.

An object of the present invention is therefore the provision of an improved cyclic process whereby an alkali-metal carbonate can be economically employed for the removal of hydrogen sulphide from gases carrying simultaneously a large proportion of carbon dioxide.

A further object of the invention is to provide a cyclic process whereby the bicarbonate content of an alkali-metal carbonate solution can be automatically controlled and any preferred dynamic or sort of "false" equilibrium be maintained between bicarbonate and the carbon dioxide in the gas irrespective of its content of the latter substance.

A further object of the present invention is to provide a simple cyclic process adapted to continuously remove hydrogen sulphide from gases containing carbon dioxide, without it being required to give great consideration to their content of the latter substance.

A further object is to provide an improved economy in the method of use of alkali-metal carbonate solutions for the stated purpose, resulting in greatly improved efficiency for both the absorption and the actification steps in such a method.

As has been previously indicated it is well known in the art that aqueous solutions of the alkali-metal carbonates can be employed to absorb hydrogen sulphide and carbon dioxide from gases containing the same. In the actification of the resulting spent solutions Sperr and Hall (U. S. Patent No. 1,533,773) employ a boiling step under reduced pressures to expel hydrogen sulphide, followed by a separate boiling step under elevated pressures to expel carbon dioxide. In the operation of their process, they treat the entire bulk of the recirculated solution for the removal of carbon dioxide to reduce the bicarbonate content thereof. Petit (U. S. Patent No. 1,598,985) to actify the spent solution, treats it with a gas containing carbon dioxide to expel the hydrogen sulphide, thereafter boiling all of the so-formed solution to again obtain carbon dioxide and a solution capable of absorbing further hydrogen sulphide. Hultman (U. S. Patent No. 1,849,526) regenerates the spent solution under a vacuum of 730 mm. which is not practical because of the excessive consumption of power required to create such high vacuum. Hultman and Pilo (U. S. Patent No. 2,094,070) recycle a definite entrapped quantity of carbon dioxide in the actification step only to obtain its benefits there. Such carbon dioxide plays no role in the absorption step.

According to the present invention the spent solution from a process of the stated type and derived from scrubbing a gaseous mixture containing large quantities of carbon dioxide is first actified in its entirety for the removal of hydrogen sulphide and thereafter a minor portion only of the total solution is sent to a further actification step, there is to be drastically treated, preferably under pressure and at higher temperatures, for the removal of the quantity of carbon dioxide which is necessary to maintain that preferred alkali-metal carbonate to bicarbonate ratio in the total solution which will assure efficient removal of hydrogen sulphide from the to-be-treated gases. This improved feature of invention advantageously makes available for actual removal of carbon dioxide from a minor portion of the solution that heat which previously had been used solely to raise the bulk of the solution to actification temperature only, and the heat effluent to the carbon dioxide removal is led directly into the solution being actified under vacuum, its carbon dioxide content being of great advantage in displacing hydrogen sulphide in that step. The solution from that pressure step is used independently in a later stage of the absorption.

Briefly stated, the cyclic process of the present improvement comprises essentially: continuously flowing a stream of hydrogen sulphide and carbon dioxide bearing gas through an absorber and bringing said gas into counter-current contact with an aqueous solution containing a mixture of a potassium carbonate and bicarbonate. The spent solution is then continuously removed to an actification step wherein the bulk of the solution is actified at reduced pressures for removal of substantially all the hydrogen sulphide, some carbon dioxide being incidentally removed. Usually a minor portion of the vacuum treated solution is then continuously withdrawn from the bulk thereof and subjected to actification with steam at atmospheric or preferably at super-atmospheric pressures, and in any case at elevated temperatures, thereby liberating substantial quantities of carbon dioxide by said boiling and thus converting a portion of its bicarbonate content to carbonate. The evolved steam and carbon dioxide issuing from this minor portion of the solution are then preferably passed into the bulk of the solution in the vacuum step of actification to assist in the actification thereof, the steam, by furnishing heat and sweep vapor to expel hydrogen sulphide, and the carbon dioxide, by reacting with the hydrosulphide, assists in crowding hydrogen sulphide from the solution, whereby the consumption of steam is decreased over that which would otherwise be necessary were steam alone employed for said actification. The extent to which carbon dioxide is removed from said minor portion of the recycled solution can be optionally varied according to requirements. For example, in certain applications larger minor quantities of solution may be thus treated to restore the solution to a preferred absorption capacity and, in other instances where the carbon dioxide content in the treated gas is lower, the amount of solution so treated can be considerably reduced. The improved process permits an easily controllable flexibility, and results in improved economy of treating gases varying both in their hydrogen sulphide and carbon dioxide contents.

The solution issuing from the pressure-treatment step contains a potassium carbonate to bicarbonate ratio which is greater than that present in the bulk of the scrubbing solution, said ratio being optionally controllable as preferred, and because of this higher ratio the absorbing capacity of such solution is proportionately greatly in excess of that of the bulk of the solution and in consequence has an enhanced hydrogen sulphide absorbing ability. This minor portion of the solution therefore is preferably not admixed with the bulk of the solution before it enters the absorber but is advantageously brought into counter-current contact with the gas being treated in a later step of the absorption where its high absorptive ability is of special utility in removing that difficulty extractable hydrogen sulphide in the latter stage of the absorption step.

In the accompanying drawing forming a part of this specification there is shown for purposes of exemplification a preferred apparatus and method in which the invention may be embodied and practiced but without limiting the claimed invention specifically to such illustrative instance.

The single figure shows a diagrammatic representation partly in elevation and partly in vertical section of apparatus for carrying out the improved gas purification process of the present invention.

In the apparatus shown in the figure, the purification of the gas takes place in absorber 1. While various types of gas and liquid contact apparatus may be employed, that of the well-known bell-and-tray type 4 is shown. The gas to be purified enters absorber 1 through pipe 2 located near the bottom thereof and passes upwardly in counter-current to a descending flow of a potassium carbonate-bicarbonate solution having absorbent properties with respect to hydrogen sulphide and carbon dioxide, the major portion of said solution being introduced through line 25 at or near the middle of said absorber. While any alkali-metal carbonate is employable in the present process, it is preferred to use potassium carbonate because its solubility and especially that of its corresponding bicarbonate permit the use of more concentrated solutions where the gas to be purified contains large quantities of hydrogen sulphide. As required, the solution concentration may be varied between one and four normal. In this so-called primary absorption step the bulk of the hydrogen sulphide and some carbon dioxide are removed from the gas which thereafter continues to pass upwardly through said absorber now in counter-current to a descending flow of a smaller amount of scrubbing solution containing a higher percentage of the potassium carbonate or a proportionately higher carbonate to bicarbonate ratio than the bulk of the scrubbing solution introduced through line 25, it in turn being introduced at or near the top of absorber 1 through line 35. In this so-called secondary absorption step said solution having a greater absorptive capacity for hydrogen sulphide is especially adapted to remove hydrogen sulphide from the traces thereof in the latter stage of the absorption step. Both the volume of said solution and the desired carbonate to bicarbonate ratio are easily controllable by methods later indicated, whereby to produce these preferred results. The so-purified gas then passes from the absorber through line 3.

For actification of the commingled solutions employed in absorber 1 there is provided apparatus which may be of the same type of construction as absorber 1, comprising a vacuum actifier 15 with bell-and-tray construction 16 and a pressure actifier 30 also with bell-and-tray construction 32, the two actifiers being separated by a solid plate 31.

Steam for the actification steps is provided by the application of direct and indirect heat through perforated line 40 and coil 39 respectively. Steam supplied to the apparatus is admitted through line 37, said steam first serving to operate vacuum pump 20, the exhaust therefrom flowing through line 38 to coil 39 for the required indirect heat and to perforated line 40 for the direct steam employed in pressure actifier 30. The steam, gases and vapors effluent to said pressure actifier pass through line 42 and pressure regulator 43 to the bottom of vacuum actifier 15 and are utilized therein to effect the preferred results. Controlled portions of steam and other constituents can however be released from the apparatus through valved line 44 connected to pressure regulator 43 when their total quantity is in excess of that required to provide the preferred result in the vacuum step. Additional steam can be added through valved line 41. Any steam effluent to the vacuum pump that is in excess of the requirements of the process step can be vented through valved line 45.

The spent solution reaching the bottom of absorber 1 is an admixture of the solutions originally admitted to said absorber through lines 25 and 35 as previously described. It passes from the absorber through line 5 to a separator 6 which serves to separate from the foul solution, by gravity, any hydrocarbons such as gasoline which may be condensed from the gas where a cracked-petroleum refinery gas or the like, is treated by the process. A separation is easily effected since the potassium carbonate and bicarbonate are insoluble in such hydrocarbons. In those instances where other gases such as coke-oven gas are treated and from which ordinarily hydrocarbons will not be condensed, said separator may be eliminated, the spent solution being pumped directly from the absorber to heat exchanger 13. The separated hydrocarbons 7 are continuously removed through line 9 to a storage tank (not shown) while the spent solution 8 is drawn from separator through line 10 by pump 11 which sends it to heat exchanger 13 to be heated by indirect contact with the previously actified solution and thereafter through line 14 to the top of vacuum actifier 15. The spent solution passes downwardly through vacuum actifier 15 in counter-current to a rising flow of steam containing other gases and vapors introduced at the bottom of said actifier. The heat content of said steam serves to boil the spent solution for the liberation of substantially all of the hydrogen sulphide and incidentally some carbon dioxide. A controlled reduced pressure is maintained in vacuum actifier 15, line 17, dephlegmator 18 and line 19 by vacuum pump 20 such that the boiling point of the spent solution in said actifier is preferably maintained between 40° C. and 80° C.

The now regenerated solution is drawn from the bottom of actifier 15 by pump 23 which sends the main portion through valved line 24 while a small side stream is taken off through valved line 27, heat exchanger 28 for further heating by the pressure-regenerated solution and through line 29 to the top of pressure actifier 30. The bulk of the vacuum-regenerated solution, now substantially free of hydrogen sulphide and with a portion of its carbon dioxide removed, is sent through valved line 24 to heat exchanger 13 where it gives up heat to the to-be-actified solution, thereafter being returned to the middle of absorber 1 through line 25 after further cooling in cooler 26. Said solution continues the cycle of absorption and actification by flowing downwardly in counter-current contact with further quantities of the to-be-purified gas.

The small side stream of vacuum-regenerated solution introduced at the top of pressure actifier 30 through line 29, as previously described, passes down through said actifier counter-current to a rising flow of steam. The volume of said side stream and the conditions under which it is treated are so chosen that the amount of carbon dioxide here liberated preferably represents that previously absorbed in one traversing of the absorber, thereby to continuously maintain its capacity to absorb hydrogen sulphide at the preferred level. The required pressure at which the solution is boiled to liberate preferred quantities of carbon dioxide and incidental quantities of hydrogen sulphide is determined empirically and may vary from atmospheric pressure to three or four atmospheres, said pressure being produced by the heat of indirect steam in coil 39 and direct steam from line 40 and maintained at the preferred level by the action of pressure regulator 43, controlling the steam and other vapors passing from the pressure to the vacuum actifiers. The heat from steam coil 39 may be employed to expel carbon dioxide by generating steam from the solution itself, if preferred. In any case some indirect steam must be supplied by said coil to balance the heat lost by radiation from both actifier shells and to supply the heat necessary to bring the solutions to be actified under vacuum and pressure to their respective boiling points. In addition to expelling carbon dioxide by boiling the solution with indirect heat it can also be boiled at the preferred elevated pressure and temperature with direct steam admitted through perforated line 40, depending on the conditions in the steam exhausted from the vacuum pump.

When the heat required to raise the bulk of the solution in the vacuum step to the temperature of actification and furnish the sweep vapor, is absorbably present in the effluent steam and gases from the pressure step, a highly desirable balance is established, because that heat which is necessary for the pressure actification and is carried away in the hot gases and vapors from that actification step is utilized in its entirety in the vacuum step. In those instances where this balance does not exist it is expedient to regulate the volume of the pressure-actified solution to establish such condition.

The preferred quantity of indirect and direct steam obtained from coil 39 and line 40 respectively is brought into contact with the downflowing solution in pressure actifier 30, as previously described, thereby boiling said solution to expel residual quantities of hydrogen sulphide but serving mainly to liberate the preferred quantity of carbon dioxide with a proportional conversion of potassium bicarbonate to carbonate, thus increasing the potassium carbonate to bicarbonate ratio of this portion of the solution to the required point above that obtaining in the bulk of the vacuum actified solution. With its capacity for the further absorption of hydrogen sulphide greatly increased the pressure-regenerated solution is withdrawn from the bottom of actifier 30 by pump 33 which sends it through line 34 to heat exchanger 28 to give up its heat to the to-be-treated vacuum-regenerated solution, thereafter returning to the top of absorber 1 through line 35 after further cooling in cooler 36. Said solution continues the cycle of operation by serving to absorb hydrogen sulphide from the traces thereof in the gas about to leave the absorber.

The current of steam carrying carbon dioxide and some hydrogen sulphide from the top of the pressure actifier, enters the bottom of vacuum actifier 15 through line 42 and pressure regulator 43 and passes upwardly through the descending spent solution. As previously described, the heat from this steam serves to boil said solution, the boiling point at the reduced presure created by vacuum pump 20, preferably ranging between 40° C. and 80° C. thereby serving to liberate substantial quantities of hydrogen sulphide. The carbon dioxide carried with such steam aids in the expulsion of hydrogen sulphide by combining with the hydrosulphide of the spent solution, thereby reducing the total quantity of steam required in the vacuum actification below the amount that would be needed were steam alone employed to effect the same degree of actification. It is preferred, for maximum economy, that the total steam required in this vacuum step be derived solely from the pressure actification step. In those instances where the hydrogen sulphide content of the to-be-actified solution is relatively small, with a relatively high proportion of carbon dioxide, the steam necessary for the required pressure actification may be in excess of that necessary to liberate the hydrogen sulphide in the vacuum step and can be vented from pressure regulator 43 through valved line 44.

The vapors reaching the top of actifier 15 and consisting of steam, hydrogen sulphide, carbon dioxide and possibly other vapors or gases leave the top of said actifier through line 17 and pass through water-cooled dephlegmator 18 where the steam and other condensable constituents are condensed, while the cooled gases consisting mainly of hydrogen sulphide with some carbon dioxide leave the dephlegmator through line 19 and are drawn through vacuum pump 20 and discharged by it to line 21 to be further disposed of as desired, for example to be burned as a preliminary operation in the manufacture of sulphuric acid.

The condensate from dephlegmator 18 consisting mainly of condensed steam saturated with hydrogen sulphide and carbon dioxide is discharged from said dephlegmator through line 22 to be returned to the system or otherwise disposed of. Since the potassium carbonate and bicarbonate employed in the process are non-volatile, there is no loss of chemical when such condensate is discarded. In those cases where the necessary sweep steam for actification is generated from the solution exclusively by indirect heat from steam or hot gases for example, return of the dephlegmator condensate would be one method of controlling the concentration of the solution. It is of course obvious that hot gases from any source can be used to boil the solution.

Where refinery gases saturated with moisture are scrubbed hot to remove hydrogen sulphide and carbon dioxide, a cooler scrubbing solution condenses water from such gases and is itself diluted. In such cases the solution may be re-concentrated in the pressure actification step by boiling with sufficient indirect heat to remove the accumulated water of such condensation in the form of steam, said steam after use in the actification will be condensed in the dephlegmator and eliminated from the system.

The improvement and new economy in gas purification resides in the easily controlled flexibility with which a dynamic or "false" equilibrium can be established in the system, resulting in efficient absorption and actification. The dynamic or "false" equilibrium of the solution is so-called because the equilibrium is optionally regulable and does not represent that which would be normally established; the chosen equilibrium largely depends on the concentration of the carbon dioxide in the gas being treated and for any given conditions is artificially produced by establishing the preferred potassium carbonate to bicarbonate ratio in a side stream taken from the main stream of the solution already vacuum actified.

Regardless of the carbon dioxide content of the to-be-treated gas the bicarbonate content thereof can be held to such concentration that hydrogen sulphide absorption is not materially interfered with and a preferred efficiency of its removal always obtainable by merely withdrawing a small portion of the main bulk of the vacuum regenerated solution and further treating it in the pressure actification step. The invention makes possible the realization of this preferred ratio along with a new economy in steam requirements in that the steam and evolved carbon dioxide from the pressure step further serve to effect the vacuum actification preferably in its entirety. Extreme flexibility results where the volume of the pressure actified solution, the pressure and temperature of treatment, and heat inflow by direct or indirect means may be easily varied to obtain the preferred equilibrium.

The results obtainable by the operation of the present process are best illustrated with a typical set of operating figures. An aqueous potassium carbonate-bicarbonate solution, originally being 2.075 normal potassium carbonate, was continuously recirculated between the absorption and actification steps in the manner previously described. A gaseous mixture was flowed through the absorber at the rate of 80,000 cubic feet per hour at 65 lbs. gauge and 55° C., said gas containing about 5% by volume of carbon dioxide and 850 grains hydrogen sulphide per 100 cubic feet, the hydrogen sulphide content being expressed on gas at standard conditions.

In the primary absorption step the said gas flowing therethrough was scrubbed with the less extensively actified solution portion flowing at 3500 gallons per hour and left contact with this solution with its hydrogen sulphide content reduced to 35 grains per 100 cubic feet (standard conditions). In the secondary absorption step the gas issuing from the primary step was brought into contact with the more extensively actified solution portion flowing at 1900 gallons per hour. The outlet gas from the absorber had its hydrogen sulphide content reduced to 5 grains per 100 cubic feet (standard conditions). The spent solution from the bottom of the absorber was continuously flowed, at a rate of 5400 gallons per hour with a content of 685 grains hydrogen sulphide per gallon along with 0.46 of the potassium in the form of the bicarbonate, to the top of the actifier, the whole being treated under a vacuum of about 2 lbs. absolute pressure, which allowed the solution to be boiled between 50° C. and 60° C. The solution issuing from the vacuum actifier had its hydrogen sulphide content reduced to 75 grains per gallon, with 0.40 of the potassium in the form of the bicarbonate, said solution being returned directly to the first stage of the absorption, excepting only a side stream of 1900 gallons per hour which was continuously flowed to the top of the pressure actifier for further treatment by boiling with steam at approximately 130° C. under a pressure of 25 lbs. gauge. This pressure-regenerated solution contained only 0.22 of the potassium in the form of bicarbonate and 55 grains hydrogen sulphide per gallon, and was then flowed after indirect heat exchange to the second stage of the absorption step.

The gases issuing from the vacuum pump contained 68% hydrogen sulphide, the remainder being mainly carbon dioxide. Since both the vacuum actification and absorption were conducted under almost identical temperatures, namely 55° C., it was possible to eliminate all heat-exchange and cooling apparatus in the solution lines connecting these two pieces of equipment.

The direct and indirect steam required to operate the system under the conditions above described totaled 3250 lbs. per hour. About 2680 lbs. per hour of steam at 175 lbs. gauge (saturated) was first passed through the vacuum pump and exhausted therefrom at a pressure sufficient to boil the solution under 25 lbs. gauge. About 570 lbs. per hour of said high pressure steam was sent directly to the pressure actifier and flowed into indirect contact with the solution therein, the combined indirect steam and vacuum pump exhaust steam being sufficient to actify the spent solution, under the above-stated conditions, to the indicated contents of potassium carbonate and bicarbonate.

In scrubbing gas of the above-given analysis by means of potassium carbonate solution having the same concentration of reagent and with the spent solution actified by a simple boiling step continued until a degree of actification in respect of hydrogen sulphide was obtained that should have guaranteed a satisfactory removal of hydrogen sulphide from new quantities of gas, it was determined that contrary to what might be expected the efficiency of hydrogen sulphide removal was drastically reduced after a few passes through the system. This serious reduction in efficiency was found to be traceable to the fact that a very large portion of the potassium carbonate had been permanently changed to the bicarbonate, the latter having substantially little ability to absorb hydrogen sulphide.

It is now possible, simply and economically to effect in a continuous process the removal of hydrogen sulphide from industrial gases also carrying large quantities of carbon dioxide. After an empirical determination of the most economical operating procedure for the given conditions, that carbonate to bicarbonate ratio is now easily maintainable in the scrubbing solution to give efficient absorption and actification, as well as the required removal of hydrogen sulphide, regardless of the carbon dioxide content of a to-be-treated gas. Because of the extreme flexibility in the operation of the present process, it is possible to employ it for the purification of a variety of industrial gases under diverse conditions of temperature, pressure and concentration of the impurities.

The invention as hereinabove set forth is embodied in particular form and manner but may be variously embodied within the scope of the claims hereinafter made.

I claim:

1. In a system for recovering hydrogen sulphide by means of a solution of mixed alkali-metal carbonate and bicarbonate from gases containing such quantities of carbon dioxide that carbonates are excessively converted to bicarbonates and decrease hydrogen sulphide absorption below a preferred level, the steps comprising: continuously flowing spent solution aforesaid from an absorption step for hydrogen sulphide and carbon dioxide through a primary actification step and boiling the same therein under vacuum of reduced pressure as compared with the pressure of the absorption step, to liberate substantially only the absorbed hydrogen sulphide; continuously flowing such a proportionate amount only of the so-actified solution through a further articfication step, and so boiling it at elevated temperature as compared with that of the primary actification step and under elevated pressure as compared with the pressure of the absorption step, as to liberate such further quantities of carbon dioxide from such solution portion as will, together with the $CO_2$ liberated in the primary actification step equal at least that quantity of carbon dioxide absorbed from the gas by the total absorption solution in the absorption step, to re-establish the original carbonate-to-bicarbonate ratio in the total solution of the system; inducing the vacuum on the primary actification step by flowing high pressure steam in sufficient quantity through a driven vacuum-pump to maintain the vacuum in the primary actification step, and flowing the effluent steam therefrom into contact with solution in said further actification step; flowing the carbon dioxide and vapors evolved from said further actification step together with the steam therefrom into contact with the solution in the primary hydrogen sulphide actification step for effecting the boiling of the solution and displacing of the hydrogen sulphide from its combinations therein; removing the $H_2S$ and $CO_2$ liberated in both actification steps and the steam from the process after their traversal of the primary actification step; and continuously flowing solution from the both actification steps back to the absorption step of the process.

2. In a system for recovering hydrogen sulphide, the steps of continuously passing a solution of mixed alkali-metal carbonate and bicarbonate into $H_2S$ absorption contact with gases containing $H_2S$ and such quantities of carbon dioxide that carbonate of the solution are converted to bicarbonates to such an extent that the solution capacity for renewed absorption of $H_2S$ is depleted after removal of the previously absorbed $H_2S$; subjecting the entire bulk of solution from the absorption step to a first stage of continuous regeneration under vacuum of reduced pressure as compared with the pressure of the absorption step to expel substantially only the absorbed $H_2S$; and thereafter, in a second stage of regeneration, continuously heating under elevated temperature and pressure as compared with the vacuum heating stage such a minor proportion of the so vacuum regenerated solution to remove $CO_2$ from bicarbonate therein, and so as to increase the ratio of carbonate to bicarbonate in the minor portion to such an extent above that ratio required in the bulk for renewed absorption of $H_2S$, that the mere commingling of the minor portion with the remainder of vacuum regenerated solution will restore in the bulk the required ratio of carbonate to bicarbonate for renewed absorption of further H₂S from gas as aforesaid; and continuously recommingling the regenerated solutions from both stages in proportion to re-establish the required carbonate to bicarbonate ratio in the entire bulk of solution, and renewing the absorption of H₂S from gas as aforesaid therewith.

3. In a process comprising a gaseous absorption step and a spent-solution regeneration step for removing H₂S from gas by means of a solution of alkali-metal carbonate-bicarbonate, the steps comprising: in the regeneration step, heating a minor portion only of the bulk of the fouled alkali-metal carbonate-bicarbonate solution under elevated pressure and temperature, and flowing a hot gaseous convective medium through the rest of the bulk of the fouled solution at a lower temperature while the solution is under vacuum; removing by said vacuum heating the bulk of the hydrogen sulphide absorbed by the bulk of the solution, before returning the solution into contact with the gas in the absorption step; removing from said minor solution portion, by said heating under elevated pressure, a quantity of $CO_2$ which will deplete its bicarbonate content to such an extent below the predetermined level for bicarbonates in the whole solution for H₂S absorption, and so regulating the amount of the portion activated as the minor portion, that the commingling of the minor portion with the merely vacuum heated residual major portion will restore to the bulk the ratio of carbonate to bicarbonate required in the bulk for the renewed absorption of H₂S; and thereafter commingling the so activated minor portion and the merely vacuum-heated portion; and purifying gas aforesaid therewith in the absorption step.

4. In the method of purifying a gas from hydrogen sulphide and carbon dioxide which comprises the recirculation of a regenerable absorbent solution of alkali-metal carbonate and bicarbonate through a cycle comprising an absorption stage in which the solution is brought into contact with the gas, and a regeneration stage in which the solution is regenerated, the improvement which consists in: washing the gas with a flow of absorbent liquid in a primary absorption stage to remove the bulk of its hydrogen sulphide content and with another flow of absorbent liquid in a secondary stage for removal of small traces of hydrogen sulphide left over in the gas from the primary stage; commingling in the primary stage the liquid from the secondary stage with the aforesaid flow of liquid for the primary stage; regenerating the fouled commingled solution by continuously passing the entire bulk thereof through a primary actification stage, and flowing steam through the same therein while it is under vacuum of reduced pressure as compared with the pressure of the absorption stage to remove the bulk of its absorbed H₂S while leaving the solution depleted in its carbonate content to a level below that required for renewed H₂S absorption; recirculating the major portion of the so regenerated bulk of said depleted solution over the gas in said primary absorption stage; continuously flowing a proportionate minor portion of the so regenerated bulk of the depleted solution through a secondary actification stage and boiling it therein under elevated temperature and pressure as compared with the primary actification stage to remove $CO_2$ from bicarbonate therein to such an extent as to increase the carbonate to bicarbonate ratio in said minor portion to such an amount in excess of the ratio thereof required in the bulk of the solution for H₂S absorption in the primary absorption stage that the commingling of the minor portion, after its traversal of the secondary absorption stage, with the depleted major portion in the primary absorption stage, will restore in the entire bulk the ratio of carbonate to bicarbonate required for absorption of the bulk of the hydrogen sulphide content of the gas in the primary absorption stage; and recirculating the so boiled minor portion over the gas in said secondary stage.

5. A process of removing hydrogen sulphide from gases containing the same and carbon dioxide, as claimed in claim 2, and in which the alkali-metal carbonate and bicarbonate mixture is a potassium carbonate and bicarbonate mixture.

ALFRED R. POWELL.